UNITED STATES PATENT OFFICE.

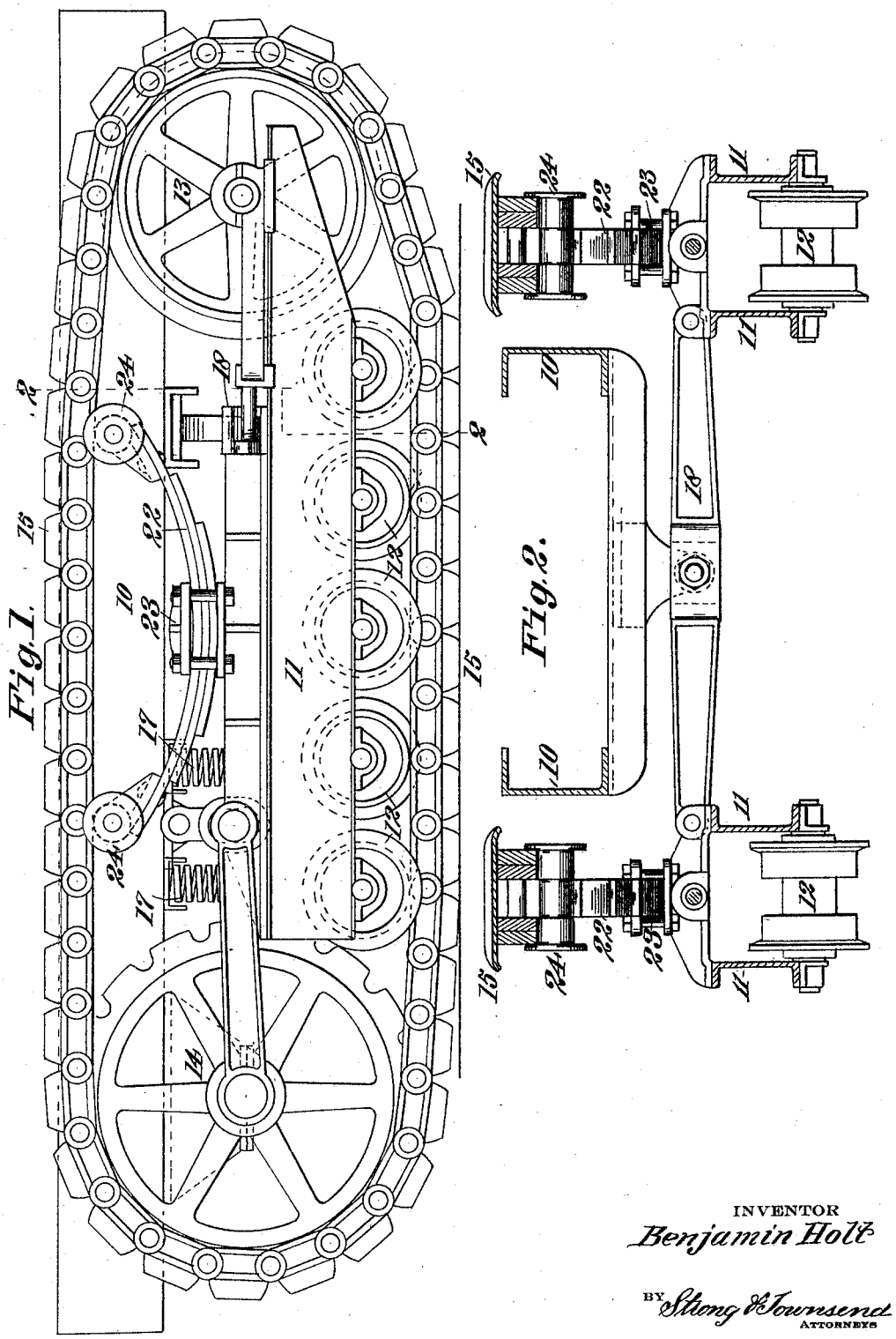

BENJAMIN HOLT, OF STOCKTON, CALIFORNIA, ASSIGNOR TO THE HOLT MANUFACTURING COMPANY, OF STOCKTON, CALIFORNIA, A CORPORATION OF CALIFORNIA.

UPPER-RUN SUPPORT FOR CHAIN-TRACKS.

1,394,995.      Specification of Letters Patent.      Patented Oct. 25, 1921.

Application filed September 16, 1919. Serial No. 324,152.

*To all whom it may concern:*

Be it known that I, BENJAMIN HOLT, a citizen of the United States, residing at Stockton, in the county of San Joaquin and State of California, have invented new and useful Improvements in Upper-Run Supports for Chain-Tracks, of which the following is a specification.

This invention relates to tractors of the chain track type and more particularly to a spring support for the upper run of the track.

It has for its object to support the upper run of the track and maintains said track under constant tension, whereby to take up slack due to wearing of the track. This I accomplish by employing a semi-elliptical leaf spring mounted upon the track frame and extending upwardly and having a roller journaled in each end thereof to engage with and support the track. The pressure of the spring is such as to maintain the track under constant tension at all times. Referring to the accompanying drawings:

Figure 1 shows a side elevation of a tractor, embodying my invention.

Fig. 2 shows a sectional view taken on line 2—2 of Fig. 1.

In the tractor illustrated herewith I show a main frame 10, at each side of which is a truck mechanism comprising a truck frame 11, on which is journaled a series of rollers 12, and at the forward end of which is journaled an idler sprocket wheel 13.

A toothed sprocket wheel 14 is journaled upon the main frame near the rear end thereof and an endless chain track 15 passes around the driving and idler sprocket wheels and beneath the rollers 12. Each truck frame 11 supports the main frame at the rear by means of coil springs 17, and at the forward end by means of an equalizer bar 18 extending between opposite truck frames and pivotally connected thereto. This construction will be well understood, being more or less well known in the art at this time. In operation it provides freedom of movement of the truck mechanisms in a vertical direction independently of the main frame and of each other.

To support the upper run of the chain track and maintain the same under constant tension, I provide a semi-elliptical laminated spring 22 mounted upon a truck frame 11 and secured thereto at its center by means of clips and bolts 23. The ends of the spring 22 extend upwardly and each has a roller 24 journaled therein and engaging the upper run of the track. The action of the spring 22 is such as to apply an upward pressure to the track, whereby to maintain the same under approximately constant tension, regardless of the tendency of the track to become slack, due to wear. By this means, all danger of the track coming off the sprocket wheels is eliminated and much of the noise is overcome inasmuch as a loose track has a tendency to slack the sprocket wheels at the upper portion thereof with considerable violence.

Having thus described my invention, what I claim and desire to secure by Letters Patent is—

1. In a tractor truck mechanism of the self-laying track type, a truck frame, a pair of sprocket wheels, an endless chain track carried by the sprocket wheels, and a support for the upper run of the track, comprising a semi-elliptical leaf spring mounted on the truck frame intermediate the ends of the latter and having its ends extending upwardly, and means carried at each end of the spring to engage the track and exert an upward force thereon.

2. In a tractor truck mechanism of the self-laying track type, a truck frame, a pair of sprocket wheels, an endless chain track carried by the sprocket wheels, a support for the upper run of the track, comprising a semi-elliptical leaf spring mounted on the truck frame and having its ends extending upwardly, and a roller journaled on each end of the spring, engaging the track, said spring acting to exert an upward force on the track to maintain the latter under constant tension.

In testimony whereof I have hereunto set my hand in the presence of two subscribing witnesses.

BENJAMIN HOLT.

Witnesses:
    O. H. ECCLESTON,
    GEORGE A. DITZ.